(12) United States Patent
Shan et al.

(10) Patent No.: US 9,647,293 B2
(45) Date of Patent: May 9, 2017

(54) GEL POLYMER COMPOSITE ELECTROLYTE, POLYMER LITHIUM ION BATTERY COMPRISING THE GEL POLYMER COMPOSITE ELECTROLYTE AND METHODS OF PREPARING THE SAME

(71) Applicant: BYD Company Limited, Shenzhen, Guangdong (CN)

(72) Inventors: Jun Shan, Shenzhen (CN); Ronghua Liu, Shenzhen (CN); Lina Jin, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/414,868

(22) PCT Filed: Aug. 28, 2013

(86) PCT No.: PCT/CN2013/082435
§ 371 (c)(1),
(2) Date: Jan. 14, 2015

(87) PCT Pub. No.: WO2014/032582
PCT Pub. Date: Mar. 6, 2014

(65) Prior Publication Data
US 2015/0171466 A1    Jun. 18, 2015

(30) Foreign Application Priority Data

Aug. 28, 2012 (CN) .......................... 2012 1 0309551

(51) Int. Cl.
*H01M 6/14*        (2006.01)
*H01M 10/0565*     (2010.01)
(Continued)

(52) U.S. Cl.
CPC ..... *H01M 10/0565* (2013.01); *H01M 10/058* (2013.01); *H01M 10/0525* (2013.01);
(Continued)

(58) Field of Classification Search
CPC ........... H01M 10/0565; H01M 10/058; H01M 10/0525; H01M 2300/0082; C08F 220/18; Y02E 60/122
(Continued)

(56) References Cited

U.S. PATENT DOCUMENTS 6,268,088 B1 * 7/2001 Oh ...................... H01M 6/162
429/213
2003/0215703 A1  11/2003 Cho
(Continued)

FOREIGN PATENT DOCUMENTS

CN    102257658 A    11/2011
JP    11-232925       8/1999
(Continued)

OTHER PUBLICATIONS

International Search Report and Written Opinion to PCT/CN2013/082435 dated Nov. 28, 2013 (11p).

*Primary Examiner* — Gary Harris
(74) *Attorney, Agent, or Firm* — Brinks Gilson & Lione (57) ABSTRACT

A gel polymer composite electrolyte, a polymer lithium ion battery comprising the gel polymer composite electrolyte and methods of preparing the polymer lithium ion battery are provided. The gel polymer composite electrolyte is formed by swelling after a polymer membrane absorbs an electrolyte, wherein the polymer membrane is formed by thermocuring a polymer mixture comprising an acrylic emulsion, water and ammonia water, and the acrylic emulsion has a glass transition temperature ranging from about −30° C. to about 50° C.

5 Claims, 3 Drawing Sheets

(51) Int. Cl.
*H01M 10/0525* (2010.01)
*H01M 10/058* (2010.01)
*C08F 220/18* (2006.01)

(52) U.S. Cl.
CPC ... *C08F 220/18* (2013.01); *H01M 2300/0082* (2013.01); *Y02E 60/122* (2013.01); *Y10T 29/4911* (2015.01)

(58) Field of Classification Search
USPC .......................................... 429/303; 29/623.2
See application file for complete search history.

(56) References Cited

U.S. PATENT DOCUMENTS

| | | | | | |
|---|---|---|---|---|---|
| 2008/0138697 | A1* | 6/2008 | Asada | ................... | C03C 14/002 |
| | | | | | 429/479 |
| 2010/0119956 | A1* | 5/2010 | Tokuda | ................ | H01M 4/134 |
| | | | | | 429/338 |
| 2010/0261047 | A1 | 10/2010 | Kim | | |
| 2011/0311870 | A1* | 12/2011 | Wakizaka | ............... | H01M 4/13 |
| | | | | | 429/217 |

FOREIGN PATENT DOCUMENTS

| | | | |
|---|---|---|---|
| JP | 2002249589 A | * | 9/2002 |
| WO | WO 00/51198 | | 8/2000 |
| WO | WO 2010/074293 A1 | | 7/2010 |

\* cited by examiner

GEL POLYMER COMPOSITE ELECTROLYTE, POLYMER LITHIUM ION BATTERY COMPRISING THE GEL POLYMER COMPOSITE ELECTROLYTE AND METHODS OF PREPARING THE SAME

CROSS-REFERENCE TO RELATED APPLICATION

The present application is the national phase of PCT/CN2013/082435, filed Aug. 28, 2013, which claims priority to Chinese Patent Application No. 201210309551.7, filed with State Intellectual Property Office of the People's Republic of China (SIPO) on Aug. 28, 2012, the entire contents of both of which are hereby incorporated by reference.

FIELD

The present disclosure relates to a field of lithium ion battery, and more particularly to a gel polymer composite electrolyte, a polymer lithium ion battery comprising the gel polymer composite electrolyte and methods of preparing the polymer lithium ion battery.

BACKGROUND

A polymer lithium ion battery is a new secondary battery system with high specific energy based on a liquid lithium ion battery. Generally, the polymer lithium ion battery comprises a negative plate, a positive plate and a polymer composite electrolyte located between the negative plate and the positive plate, in which the positive plate comprises a positive current collector and a positive active material, the negative plate comprises a negative current collector and a negative active material, and the positive active material and the negative active material are located oppositely in the battery shell. Compared with a conventional liquid lithium ion battery, the polymer lithium ion battery has following advantages. Firstly, the use of a polymer composite electrolyte instead of a liquid electrolyte solution may effectively avoid the problem of electrolyte solution leakage of the liquid lithium ion battery, thus ensuring a high reliability of the battery. Secondly, the use of a light soft plastic shell instead of a metal shell may not only decrease the weight of the battery shell effectively to improve the specific energy of the battery, but also may lower the probability of the risks such as explosion and burning to enhance the safety performance of the polymer lithium ion battery. Thirdly, it is convenient to design the shape of the polymer lithium ion battery to develop ultrathin, mega-sized and various shaped batteries.

SUMMARY

In viewing thereof, the present disclosure is aimed to solve at least a problem existing in the related art. Accordingly, a gel polymer composite electrolyte is provided, which has excellent safety performance, good electrochemical performance and resistance to high voltage. Accordingly, a polymer lithium ion battery is provided, which has excellent safety performance, non-leakage and excellent cycling stability. Further, a method of preparing the polymer lithium ion battery is provided.

According to an aspect of the present disclosure, a gel polymer composite electrolyte is provided. The gel polymer composite electrolyte is formed by swelling after a polymer membrane absorbs an electrolyte, wherein the polymer membrane is formed by thermocuring a polymer mixture comprising an acrylic emulsion, water and ammonia water, and wherein the acrylic emulsion has a glass transition temperature ranging from about $-30°$ C. to about $50°$ C.

According to another aspect of the present disclosure, a polymer lithium ion battery is provided. The polymer lithium ion battery comprises: a negative plate; a positive plate; a separator; and a gel polymer composite electrolyte located between the negative plate and the positive plate, wherein the gel polymer composite electrolyte is formed by swelling after a polymer membrane absorbs an electrolyte, the polymer membrane is formed by thermocuring a polymer mixture comprising an acrylic emulsion, water and ammonia water, and wherein the acrylic emulsion has a glass transition temperature ranging from about $-30°$ C. to about $50°$ C.

According to another aspect of the present disclosure, a method of preparing a polymer lithium ion battery is provided. The method comprises the steps of: preparing a composite separator by coating a polymer mixture onto a surface of a separator and thermocuring the polymer mixture; preparing a battery core by laminating or coiling a positive plate, the composite separator and a negative plate orderly; and injecting an electrolyte into the battery core and sealing, wherein the polymer mixture comprises an acrylic emulsion having a glass transition temperature of about $-30°$ C. to about $50°$ C., water and ammonia water.

According to yet another aspect of the present disclosure, a method of preparing a polymer lithium ion battery is provided. The method comprises the steps of: preparing a composite positive plate by coating a polymer mixture onto a surface of a positive plate and thermocuring the polymer mixture; preparing a battery core by laminating or coiling the composite positive plate, a separator and a negative plate orderly; and injecting an electrolyte into the battery core and sealing, wherein the polymer mixture comprises an acrylic emulsion having a glass transition temperature ranging from about $-30°$ C. to about $50°$ C., water and ammonia water.

According to yet another aspect of the present disclosure, a method of preparing a polymer lithium ion battery is provided. The method comprises the steps of: preparing a composite negative plate by coating a polymer mixture onto a surface of a negative plate and thermocuring the polymer mixture; preparing a battery core by laminating or coiling a positive plate, a separator and the composite negative plate orderly; and injecting an electrolyte into the battery core and sealing, wherein the polymer mixture comprises an acrylic emulsion having a glass transition temperature of about $-30°$ C. to about $50°$ C., water and ammonia water.

In the gel polymer composite electrolyte according to the present disclosure, the polymer membrane formed by self cross-linking the acrylic emulsion having a specific glass transition temperature, is used as the polymer matrix of the gel polymer composite electrolyte, and thus the membrane manufacturing process of the polymer membrane is simplified with easy operability, which causes less pollution to the environment without using any organic solvent and reduces the manufacturing costs thereof accordingly. Further, the acrylic emulsion having a specific glass transition temperature has a high self-cross-linkable conversion rate, and thus the resulting polymer membrane has an improved thermostability. Further, the polymer membrane has an excellent hydrophily and a high liquid retention rate. In addition, the gel polymer composite electrolyte absorbing an electrolyte has a stable electrochemical performance, a high resistance to high voltage and an improved mechanical strength. Further, it is possible to inhibit the formation of a lithium dendrite and ensure a high safety performance and a good cycling stability without leakage, when the gel polymer composite electrolyte according to the present disclosure is used in a polymer lithium ion battery.

In the method of preparing the polymer lithium ion battery according to the present disclosure, the polymer membrane has finished self-cross-linking (i.e., has a three-dimensional network structure) before assembled into the battery. After adding an electrolyte, only two steps happen: the first step of absorbing the electrolyte by the polymer membrane, and the second step of swelling the three-dimensional network structure by the electrolyte to form the gel polymer composite electrolyte, which simplifies the manufacturing process thereof with enhanced operability. Still further, it is ensured that the polymer lithium ion battery has an improved safety performance and a good cycling stability without leakage.

BRIEF DESCRIPTION OF THE DRAWINGS

Exemplary embodiments of the present disclosure will be described in detail based on the following drawings.

DETAILED DESCRIPTION

It will be appreciated by those of ordinary skill in the art that the disclosure may be embodied in other specific forms without departing from the spirit or essential character thereof. The presently disclosed embodiments are therefore considered in all respects to be illustrative but not limiting.

A gel polymer composite electrolyte is formed by swelling after a polymer membrane absorbs an electrolyte. The polymer membrane is formed by thermocuring a polymer mixture. The polymer mixture comprises an acrylic emulsion, water and ammonia water. The acrylic emulsion has a glass transition temperature ranging from about −30° C. to about 50° C.

At present, SCPAs (self cross-linkable polyacrylates) has been widely used in technological fields, such as leather finishing, fiber processing, plastic preparation, corrosion protection of metal, rust protection of metal, carpentry production and external wall decoration. SCPAs may be self chemically cross-linked under heating conditions to form a three-dimensional network structure.

The inventors of the present disclosure have unexpectedly found that, in order to make the polymer lithium ion battery have more excellent hydrophily, relatively high mechanical strength, improved thermostability, and high liquid retention rate, the three-dimensional network structure formed by SCPAs is used as a polymer matrix in a polymer lithium ion battery. However, not all kinds of SCPAs can be applicable to lithium ion batteries.

The inventors of the present disclosure have further found that, in the gel polymer composite electrolyte according to the present disclosure, the polymer membrane formed by self cross-linking the acrylic emulsion having a specific glass transition temperature (about −30° C. to about 50° C.), is used as the polymer matrix of the gel polymer composite electrolyte, and thus the membrane manufacturing process of the polymer membrane is simplified with easy operability, which causes less pollution to the environment without using any organic solvent and reduces the manufacturing costs thereof accordingly. Meanwhile, the acrylic emulsion having a specific glass transition temperature has a high self-cross-linkable conversion rate, and thus the resulting polymer membrane has an improved thermostability. Further, the polymer membrane has an excellent hydrophily and a high liquid retention rate. In addition, the gel polymer composite electrolyte absorbing an electrolyte has a stable electrochemical performance, a high resistance to high voltage and an improved mechanical strength. Further, it is possible to inhibit the formation of a lithium dendrite and ensure a high safety performance and a good cycling stability without leakage, when the gel polymer composite electrolyte according to the present disclosure is used in a polymer lithium ion battery.

Specifically, according to embodiments of the present disclosure, the principle of forming the gel polymer composite electrolyte by forming the polymer membrane by thermocuring and self-cross-linking the acrylic emulsion having a specific glass transition temperature (about −30° C. to about 50° C.) and making the polymer membrane absorb an electrolyte is as follows: the acrylic emulsion having a specific glass transition temperature (about −30° C. to about 50° C.) is self chemically cross-linked under heating conditions to make a plurality of acrylate linear macromolecules of the acrylic emulsion cross-linked to form a three-dimensional network structure, and then a polymer membrane with a high themostability and an excellent mechanical strength is obtained, which has a large number of acrylate groups. Since the polymer membrane bearing acrylate groups has similar functional groups to the carbonate organic solvent used in the electrolyte of a lithium ion battery, the polymer membrane has a good compatibility with the electrolyte, so as to absorb the electrolyte well and keep the electrolyte in the three-dimensional network structure. Further, the polymer membrane and the metal lithium electrode have smaller interface impedance with a better interface stability, so that the polymer membrane is an ideal matrix composition of the gel polymer composite electrolyte.

As mentioned above, the polymer membrane is formed by thermocuring a polymer mixture under heating conditions, and the acrylic emulsion in the polymer mixture is self cross-linked to form a three-dimensional network structure. In one embodiment, the thermocuring is performed at a temperature of about 30° C. to about 100° C. for about 0.01 hours to about 24 hours, preferably at a temperature of about 50° C. to about 85° C. for about 0.05 hours to about 10 hours.

In one embodiment, the acrylic emulsion has a glass transition temperature ranging from about −18° C. to about 38° C. The inventors of the present disclosure have found that, after the acrylic emulsion with the above glass transition temperature is self cross-linked to form the polymer membrane, it is more convenient to soften the gel polymer composite electrolyte skeleton, thus facilitating the absorption of the electrolyte.

In the present disclosure, the polymer mixture not only comprises an acrylic emulsion, but also comprises water and ammonia water. Water is used to dilute the acrylic emulsion, but after water is added, the coating uniformity will be influenced. Therefore, ammonia water is added to increase the apparent viscosity to make the final membrane thin and uniform. In one embodiment, a volumetric ratio of the acrylic emulsion to the water is about 100:5 to about 100:50, and the amount of ammonia water ranges from about 0.001 wt % to about 10 wt %, based on the total weight of the acrylic emulsion and the water. Preferably, the volumetric ratio of the acrylic emulsion to the water is about 100:10 to about 100:30, and the amount of ammonia water ranges from about 0.01 wt % to about 5 wt %, more preferably about 0.1 wt % to about 2 wt %, based on the total weight of the acrylic emulsion and the water. The ammonia water preferably has a concentration of about 25 wt %, without limitation.

A person skilled in the art would know that the acrylic emulsion comprises an acrylic copolymer, water and an emulsifier. In the present disclosure, selecting the acrylic emulsion with an appropriate glass transition temperature may meet the operating requirements of the polymer lithium ion battery. Furthermore, there are no special requirements for the special chain structure of the acrylic copolymer in the acrylic emulsion. Thus, a person skilled in the art can make a proper selection of common acrylate monomers to ensure that the glass transition temperature of the acrylic emulsion formed by polymerizing the acrylate monomer to form a polymer and emulsifying the polymer is in the range defined in the present disclosure.

For example, in the related art, the acrylic copolymer is formed by copolymerizing monomers comprising kinds of acrylate groups. In order to enable the subsequent thermocuring, a cross-linking agent with an active group (such as hydroxyl) is selected when selecting the monomers. Accordingly, the acrylic copolymer usually comprises a monomer unit and a cross linking unit, wherein the monomer unit is used to adjust the glass transition temperature of the final acrylic copolymer, and the cross linking unit is usually used for the subsequent thermocuring (such as a condensation dehydration of the active group hydroxyl to form an ether bond).

In the present disclosure, the monomer unit is formed by polymerizing a common acrylic monomer. By way of example and without limitation, the common acrylic monomer comprises at least two compounds selected from the group consisting of butyl acrylate, methyl methacrylate, ethyl methacrylate, propyl methacrylate, butyl methacrylate (BMA), isobutyl methacrylate, methyl acrylate, polyglycol diacrylate, ethyl acrylate (EA) and acrylic acid (AA). The cross linking unit is formed by polymerizing a cross linking monomer. By way of example and without limitation, the cross linking monomer may be various acrylic monomers containing active groups, for example, may be selected from the group consisting of hydroxyethyl acrylates, hydroxypropyl acrylates, hydroxyethyl methacrylates, hydroxypropyl methacrylates, and N-hydromethyl acrylamides.

In some embodiments, the emulsifier is able to facilitate the homogeneous dispersion of the acrylic copolymer in water to form a homogeneous acrylic emulsion. Preferably, based on the weight of the acrylic copolymer, the amount of the emulsifier is about 1 wt % to 10 wt %, more preferably about 2 wt % to 3 wt %. In some embodiments, the emulsifier is a complex emulsifier, such as a mixed system of an anionic emulsifier, a nonionic emulsifier and a reactive emulsifier. By way of example and without limitation, the anionic emulsifier is selected from the group consisting of sodium dodecyl sulfate, and sodium dodecylbenzene sulfonate; the nonionic emulsifier is selected from the group consisting of a fatty alcohol polyoxyethylene ether AEO9, an alkyl phenol polyoxyethylene ether OP-10, and a polyoxyethylene nonyl phenyl ether TX-10; and the reactive emulsifier is sodium vinyl sulfonate.

As described above, the monomer unit is used to adjust the glass transition temperature of the final acrylic copolymer, and the cross linking unit is usually used for the subsequent thermocuring. In some embodiments, the weight ratio of the monomer unit to the cross linking unit ranges from about 100:0.1 to about 100:5, preferably, from about 100:1 to about 100:3.

In some embodiments, the electrolyte comprises a lithium salt and an organic solvent. The lithium salt may be any suitable ionizable lithium salt, for example, selected from the group consisting of lithium hexafluorophosphate (LiPF6), lithium perchlorate (LiClO4), and lithium tetrafluoroborate (LiBF4). The organic solvent is selected from the group consisting of ethylene carbonate (EC), propylene carbonate (PC), dimethyl carbonate (DMC), methyl ethyl carbonate (EMC), diethyl carbonate (DEC), vinylene carbonate (VC), or combinations thereof. The concentration of the lithium salt preferably ranges from about 0.8 mol/L to about 1.5 mol/L.

A polymer lithium ion battery is also provided. The polymer lithium ion battery comprises: a negative plate; a positive plate; a separator; and the aforementioned gel polymer composite electrolyte located between the negative plate and the positive plate, wherein the gel polymer composite electrolyte is formed by swelling after a polymer membrane absorbs an electrolyte, the polymer membrane is formed by thermocuring a polymer mixture comprising an acrylic emulsion, water and ammonia water, and the acrylic emulsion has a glass transition temperature ranging from about −30° C. to about 50° C. The polymer lithium ion battery in the present disclosure has an excellent safety performance, and an excellent cycling stability without leakage.

According to another aspect of the present disclosure, a method of preparing the polymer lithium ion battery is provided. The method comprises the steps of: preparing a composite separator by coating a polymer mixture onto a surface of a separator and thermocuring the polymer mixture; preparing a battery core by laminating or coiling a positive plate, the composite separator and a negative plate orderly; and injecting an electrolyte into the battery core and sealing, wherein the polymer mixture comprises an acrylic emulsion having a glass transition temperature of about −30° C. to about 50° C., water and ammonia water.

According to yet another aspect of the present disclosure, a method of preparing a polymer lithium ion battery is provided. The method comprises the steps of: preparing a composite positive plate by coating a polymer mixture onto a surface of a positive plate and thermocuring the polymer mixture; preparing a battery core by laminating or coiling the composite positive plate, a separator and a negative plate orderly; and injecting an electrolyte into the battery core and sealing, wherein the polymer mixture comprises an acrylic emulsion having a glass transition temperature ranging from about −30° C. to about 50° C., water and ammonia water.

According to yet another aspect of the present disclosure, a method of preparing a polymer lithium ion battery is provided. The method comprises the steps of: preparing a composite negative plate by coating a polymer mixture onto a surface of a negative plate and thermocuring the polymer mixture; preparing a battery core by laminating or coiling a positive plate, a separator and the composite negative plate orderly; and injecting an electrolyte into the battery core and sealing, wherein the polymer mixture comprises an acrylic emulsion having a glass transition temperature of about −30° C. to about 50° C., water and ammonia water.

In the methods of preparing the polymer lithium ion battery according to embodiments of the present disclosure, the polymer membrane has finished self-cross-linking (i.e., has a three-dimensional network structure) before assembled into the battery. After adding an electrolyte, only two steps happen: the first step of absorbing the electrolyte by the polymer membrane, and the second step of swelling the three-dimensional network structure by the electrolyte to form the gel polymer composite electrolyte, which simplifies the manufacturing process thereof with enhanced operability. Still further, it is ensured that the polymer lithium ion battery has an improved safety performance and a good cycling stability without leakage.

According to yet another aspect of the present disclosure, a method of preparing the gel polymer composite electrolyte is provided. The method comprises the steps of: preparing a composite separator, a composite positive plate or a composite negative plate by coating a polymer mixture onto a surface of a separator, a positive plate or a negative plate and thermocuring the polymer mixture; assembling the composite separator, the composite positive plate or the composite negative plate in a battery; and injecting an electrolyte into the battery so that the polymer membrane on the surfaces of the composite separator, the composite positive plate or the composite negative plate will absorb the electrolyte and swell to form the gel polymer composite electrolyte.

In some embodiments, after the thermocuring, the thickness of the polymer membrane coated on the surface of the composite separator, the composite positive plate or the composite negative plate ranges from about 0.01 μm to about 110 μm, preferably from about 0.1 μm to about 80 μm, more preferably from about 0.1 μm to about 20 μm.

Hereinafter, the present disclosure will be described more specially with reference to the following examples. The following examples are for illustrative purposes only and are not intended to limit the scope of the present disclosure.

Preparation of Polymer Lithium Ion Battery Including Gel Polymer Composite Electrolyte Example 1

An acrylic emulsion with a glass transition temperature of 0° C. was mixed with water, in which a volumetric ratio of the acrylic emulsion to the water was 100:10. Then, ammonia water with a concentration of 25 wt % was added in an amount of 0.1 wt % based on the total weight of the acrylic emulsion and the water. The acrylic emulsion, the water and the ammonia water were mixed uniformly under magnetic stirring to prepare a polymer mixture.

The polymer mixture was coated onto two surfaces of a PE separator and baked at a temperature of 85° C. for 10 hours to prepare a composite separator Ma1 coated with a polymer membrane. The thickness of the polymer membrane was 19.3 μm.

The polymer mixture was cast onto a PTFE (polytetrafluoroethylene) plate and baked at a temperature of 85° C. for 10 hours to prepare a testing membrane Mb1 coated with a polymer membrane.

The composite separator Ma1 was cut into wafers with a diameter of 17 mm, which were dried at a temperature of 30° C. for 12 hours and then put into a glove box filled with argon gas.

$LiCoO_2$, a binder and carbon black were mixed in a weight ratio of 100:0.8:0.5 to prepare a slurry (i.e. positive material), which was coated onto an aluminium foil to prepare a positive plate.

The composite separator Ma1 was used for separating a lithium plate (i.e. negative plate) from the positive plate to form a battery core, an electrolyte was injected into the battery core, and sealing was performed to form a 2016 type Li/$LiCoO_2$ polymer lithium ion battery S10.

Example 2

An acrylic emulsion with a glass transition temperature of 15° C. was mixed with water, in which a volumetric ratio of the acrylic emulsion to the water was 100:20. Then, ammonia water with a concentration of 25 wt % was added in an amount of 0.2 wt % based on the total weight of the acrylic emulsion and the water. The acrylic emulsion, the water and the ammonia water were mixed uniformly under magnetic stirring to prepare a polymer mixture.

The polymer mixture was coated onto two surfaces of a PE separator and baked at a temperature of 75° C. for 10 hours to prepare a composite separator Ma2 coated with a polymer membrane. The thickness of the polymer membrane was 14.2 μm.

The polymer mixture was cast onto a PTFE plate and baked at a temperature of 75° C. for 10 hours to prepare a testing membrane Mb2 coated with a polymer membrane.

The composite separator Ma2 was cut into wafers with a diameter of 17 mm, which were dried at a temperature of 30° C. for 12 hours and then put into a glove box filled with argon gas.

$LiCoO_2$, a binder and carbon black were mixed in a weight ratio of 100:0.8:0.5 to prepare a slurry (i.e. positive material), which was coated onto an aluminium foil to prepare a positive plate.

The composite separator Ma2 was used for separating a lithium plate (i.e. negative plate) from the positive plate to form a battery core, an electrolyte was injected into the battery core, and sealing was performed to form a 2016 type Li/$LiCoO_2$ polymer lithium ion battery S20.

Example 3

An acrylic emulsion with a glass transition temperature of 25° C. was mixed with water, in which a volumetric ratio of the acrylic emulsion to the water was 100:30. Then, ammonia water with a concentration of 25 wt % was added in an amount of 0.3 wt % based on the total weight of the acrylic emulsion and the water. The acrylic emulsion, the water and the ammonia water were mixed uniformly under magnetic stirring to prepare a polymer mixture.

The polymer mixture was coated onto two surfaces of a PE separator and baked at a temperature of 65° C. for 10 hours to prepare a composite separator Ma3 coated with a polymer membrane. The thickness of the polymer membrane was 9.6 μm.

The polymer mixture was cast onto a PTFE plate and baked at a temperature of 65° C. for 10 hours to prepare a testing membrane Mb3 coated with a polymer membrane.

The composite separator Ma3 was cut into wafers with a diameter of 17 mm, which were dried at a temperature of 30° C. for 12 hours and then put into a glove box filled with argon gas.

$LiCoO_2$, a binder and carbon black were mixed in a weight ratio of 100:0.8:0.5 to prepare a slurry (i.e. positive material), which was coated onto an aluminium foil to prepare a positive plate.

The composite separator Ma3 was used for separating a lithium plate (i.e. negative plate) from the positive plate to form a battery core, an electrolyte was injected into the battery core, and sealing was performed to form a 2016 type Li/$LiCoO_2$ polymer lithium ion battery S30.

Example 4

An acrylic emulsion with a glass transition temperature of 0° C. was mixed with water, in which a volumetric ratio of the acrylic emulsion to the water was 100:30. Then, ammonia water with a concentration of 25 wt % was added in an amount of 0.1 wt % based on the total weight of the acrylic emulsion and the water. The acrylic emulsion, the water and the ammonia water were mixed uniformly under magnetic stirring to prepare a polymer mixture.

The polymer mixture was coated onto two surfaces of a PE separator and baked at a temperature of 75° C. for 10 hours to prepare a composite separator Ma4 coated with a polymer membrane. The thickness of the polymer membrane was 13.9 μm.

The polymer mixture was cast onto a PTFE plate and baked at a temperature of 75° C. for 10 hours to prepare a testing membrane Mb4 coated with a polymer membrane.

The composite separator Ma4 was cut into wafers with a diameter of 17 mm, which were dried at a temperature of 30° C. for 12 hours and then put into a glove box filled with argon gas.

$LiCoO_2$, a binder and carbon black were mixed in a weight ratio of 100:0.8:0.5 to prepare a slurry (i.e. positive material), which was coated onto an aluminium foil to prepare a positive plate.

The composite separator Ma4 was used for separating a lithium plate (i.e. negative plate) from the positive plate to form a battery core, an electrolyte was injected into the battery core, and sealing was performed to form a 2016 type Li/$LiCoO_2$ polymer lithium ion battery S40.

Example 5

An acrylic emulsion with a glass transition temperature of 15° C. was mixed with water, in which a volumetric ratio of the acrylic emulsion to the water was 100:10. Then, ammonia water with a concentration of 25 wt % was added in an amount of 0.3 wt % based on the total weight of the acrylic emulsion and the water. The acrylic emulsion, the water and the ammonia water were mixed uniformly under magnetic stirring to prepare a polymer mixture.

The polymer mixture was coated onto two surfaces of a PE separator and baked at a temperature of 85° C. for 10 hours to prepare a composite separator Ma5 coated with a polymer membrane. The thickness of the polymer membrane was 18.7 μm.

The polymer mixture was cast onto a PTFE plate and baked at a temperature of 85° C. for 10 hours to prepare a testing membrane Mb5 coated with a polymer membrane.

The composite separator Ma5 was cut into wafers with a diameter of 17 mm, which were dried at a temperature of 30° C. for 12 hours and then put into a glove box filled with argon gas.

$LiCoO_2$, a binder and carbon black were mixed in a weight ratio of 100:0.8:0.5 to prepare a slurry (i.e. positive material), which was coated onto an aluminium foil to prepare a positive plate.

The composite separator Ma5 was used for separating a lithium plate (i.e. negative plate) from the positive plate to form a battery core, an electrolyte was injected into the battery core, and sealing was performed to form a 2016 type Li/$LiCoO_2$ polymer lithium ion battery S50.

Example 6

An acrylic emulsion with a glass transition temperature of 25° C. was mixed with water, in which a volumetric ratio of the acrylic emulsion to the water was 100:30. Then, ammonia water with a concentration of 25 wt % was added in an amount of 0.1 wt % based on the total weight of the acrylic emulsion and the water. The acrylic emulsion, the water and the ammonia water were mixed uniformly under magnetic stirring to prepare a polymer mixture.

The polymer mixture was coated onto two surfaces of a PE separator and baked at a temperature of 65° C. for 10 hours to prepare a composite separator Ma6 coated with a polymer membrane. The thickness of the polymer membrane was 9.1 μm.

The polymer mixture was cast onto a PTFE plate and baked at a temperature of 65° C. for 10 hours to prepare a testing membrane Mb6 coated with a polymer membrane.

The composite separator Ma6 was cut into wafers with a diameter of 17 mm, which were dried at a temperature of 30° C. for 12 hours and then put into a glove box filled with argon gas.

$LiCoO_2$, a binder and carbon black were mixed in a weight ratio of 100:0.8:0.5 to prepare a slurry (i.e. positive material), which was coated onto an aluminium foil to prepare a positive plate.

The composite separator Ma6 was used for separating a lithium plate (i.e. negative plate) from the positive plate to form a battery core, an electrolyte was injected into the battery core, and sealing was performed to form a 2016 type Li/$LiCoO_2$ polymer lithium ion battery S60.

Example 7

An acrylic emulsion with a glass transition temperature of 0° C. was mixed with water, in which a volumetric ratio of the acrylic emulsion to the water was 100:20. Then, ammonia water with a concentration of 25 wt % was added in an amount of 0.2 wt % based on the total weight of the acrylic emulsion and the water. The acrylic emulsion, the water and the ammonia water were mixed uniformly under magnetic stirring to prepare a polymer mixture.

Styrene-butadiene rubber (SBR) and carboxymethylcellulose (CMC) were dissolved in water, and then mixed with artificial graphite and a conductive agent under high-speed stirring at room temperature for 3.5 hours to prepare a negative material, in which the weight ratio of SBR, CMC, the artificial graphite and the conductive agent was 2.5:1.5:90:6. The negative material was coated onto a copper foil, baked and pressed to form a negative plate.

$LiCoO_2$, a binder and carbon black were mixed in a weight ratio of 100:0.8:0.5 to prepare a slurry (i.e. positive material). The slurry was coated onto an aluminium foil to prepare a positive plate.

The polymer mixture was coated onto the negative plate with a coater, and baked at a temperature of 65° C. for 10 hours to prepare a composite negative plate Ma7 (negative) coated with a polymer membrane. The polymer mixture was coated onto the positive plate with the coater, and baked at a temperature of 65° C. for 10 hours to prepare a composite positive plate Ma7 (positive) coated with a polymer membrane. The thickness of the polymer membrane coated on the composite negative plate Ma7 (negative) is 5.3 μm, and the thickness of the polymer membrane coated on the composite positive plate Ma7 (positive) is 4.9 μm.

The polymer mixture was cast onto a PTFE plate and baked at a temperature of 65° C. for 10 hours to prepare a testing membrane Mb7 coated with a polymer membrane.

The composite negative plate Ma7 (negative) was cut into wafers with a diameter of 16 mm, which were dried at a temperature of 85° C. under vacuum for 12 hours and then put into a glove box filled with argon gas. The composite positive plate Ma7 (positive) was cut into wafers with a diameter of 13 mm, which were dried at a temperature of 85° C. under vacuum for 12 hours and then put into a glove box filled with argon gas.

A PE separator was used for separating the composite negative plate Ma7 (negative) from the composite positive plate Ma7 (positive) to form a battery core, an electrolyte was injected into the battery core, and sealing was performed to form a 2016 type artificial graphite/LiCoO$_2$ polymer lithium ion battery S70.

Example 8

An acrylic emulsion with a glass transition temperature of 25° C. was mixed with water, in which a volumetric ratio of the acrylic emulsion to the water was 100:10. Then, ammonia water with a concentration of 25 wt % was added in an amount of 0.3 wt % based on the total weight of the acrylic emulsion and the water. The acrylic emulsion, the water and the ammonia water were mixed uniformly under magnetic stirring to prepare a polymer mixture.

Styrene-butadiene rubber (SBR) and carboxymethylcellulose (CMC) were dissolved in water, and then mixed with artificial graphite and a conductive agent under high-speed stirring at room temperature for 3.5 hours to prepare a negative material, in which the weight ratio of SBR, CMC, the artificial graphite and the conductive agent was 2.5:1.5:90:6. The negative material was coated onto a copper foil, baked and pressed to form a negative plate.

LiCoO$_2$, a binder and carbon black were mixed in a weight ratio of 100:0.8:0.5 to prepare a slurry (i.e. positive material). The slurry was coated onto an aluminium foil to prepare a positive plate.

The polymer mixture was coated onto the negative plate with a coater, and baked at a temperature of 75° C. for 10 hours to prepare a composite negative plate Ma8 (negative) coated with a polymer membrane. The polymer mixture was coated onto the positive plate with the coater, and baked at a temperature of 75° C. for 10 hours to prepare a composite positive plate Ma8 (positive) coated with a polymer membrane. The thickness of the polymer membrane coated on the composite negative plate Ma8 (negative) is 9.2 μm, and the thickness of the polymer membrane coated on the composite positive plate Ma8 (positive) is 8.6 μm.

The polymer mixture was cast onto a PTFE plate and baked at a temperature of 75° C. for 10 hours to prepare a testing membrane Mb8 coated with a polymer membrane.

The composite negative plate Ma8 (negative) was cut into wafers with a diameter of 16 mm, which were dried at a temperature of 85° C. under vacuum for 12 hours and then put into a glove box filled with argon gas. The composite positive plate Ma8 (positive) was cut into wafers with a diameter of 13 mm, which were dried at a temperature of 85° C. under vacuum for 12 hours and then put into a glove box filled with argon gas.

A PE separator was used for separating the composite negative plate Ma8 (negative) from the composite positive plate Ma8 (positive) to form a battery core, an electrolyte was injected into the battery core, and sealing was performed to form a 2016 type artificial graphite/LiCoO$_2$ polymer lithium ion battery S80.

Example 9

An acrylic emulsion with a glass transition temperature of 15° C. was mixed with water, in which a volumetric ratio of the acrylic emulsion to the water was 100:30. Then, ammonia water with a concentration of 25 wt % was added in an amount of 0.1 wt % based on the total weight of the acrylic emulsion and the water. The acrylic emulsion, the water and the ammonia water were mixed uniformly under magnetic stirring to prepare a polymer mixture.

Styrene-butadiene rubber (SBR) and carboxymethylcellulose (CMC) were dissolved in water, and then mixed with artificial graphite and a conductive agent under high-speed stirring at room temperature for 3.5 hours to prepare a negative material, in which the weight ratio of SBR, CMC, the artificial graphite and the conductive agent was 2.5:1.5:90:6. The negative material was coated onto a copper foil, baked and pressed to form a negative plate.

LiCoO$_2$, a binder and carbon black were mixed in a weight ratio of 100:0.8:0.5 to prepare a slurry (i.e. positive material). The slurry was coated onto an aluminium foil to prepare a positive plate.

The polymer mixture was coated onto the negative plate with a coater, and baked at a temperature of 85° C. for 10 hours to prepare a composite negative plate Ma9 (negative) coated with a polymer membrane. The polymer mixture was coated onto the positive plate with the coater, and baked at a temperature of 85° C. for 10 hours to prepare a composite positive plate Ma9 (positive) coated with a polymer membrane. The thickness of the polymer membrane coated on the composite negative plate Ma9 (negative) is 4.8 μm, and the thickness of the polymer membrane coated on the composite positive plate Ma9 (positive) is 4.1 μm.

The polymer mixture was cast onto a PTFE plate and baked at a temperature of 85° C. for 10 hours to prepare a testing membrane Mb9 coated with a polymer membrane.

The composite negative plate Ma9 (negative) was cut into wafers with a diameter of 16 mm, which were dried at a temperature of 85° C. under vacuum for 12 hours and then put into a glove box filled with argon gas. The composite positive plate Ma9 (positive) was cut into wafers with a diameter of 13 mm, which were dried at a temperature of 85° C. under vacuum for 12 hours and then put into a glove box filled with argon gas.

A PE separator was used for separating the composite negative plate Ma9 (negative) from the composite positive plate Ma9 (positive) to form a battery core, an electrolyte was injected into the battery core, and sealing was performed to form a 2016 type artificial graphite/LiCoO$_2$ polymer lithium ion battery S90.

Comparative Example 1

A poly(methyl methacrylate) (PMMA) with a glass transition temperature of 105° C. was uniformly mixed with tetrahydrofuran (THF) under magnetic stirring to prepare a mixture, in which the weight ratio of PMMA to THF was 5:100.

The mixture was coated onto two surfaces of a PE separator and baked at a temperature of 60° C. for 10 hours to prepare a composite separator Ra1 coated with a polymer membrane. The thickness of the polymer membrane was 8.3 μm.

The mixture was cast onto a PTFE plate and baked at a temperature of 60° C. for 10 hours to prepare a testing membrane Rb1 coated with a polymer membrane.

The composite separator Ra1 was cut into wafers with a diameter of 17 mm, which were dried at a temperature of 80° C. under vacuum for 12 hours and then put into a glove box filled with argon gas.

$LiCoO_2$, a binder and carbon black were mixed in a weight ratio of 100:0.8:0.5 to prepare a slurry (i.e. positive material), which was coated onto an aluminium foil to prepare a positive plate.

The composite separator Ra1 was used for separating a lithium plate (i.e. negative plate) from the positive plate to form a battery core, an electrolyte was injected into the battery core, and sealing was performed to form a 2016 type $Li/LiCoO_2$ polymer lithium ion battery DS10.

Comparative Example 2

A poly(methyl methacrylate) (PMMA) with a glass transition temperature of 105° C. was uniformly mixed with tetrahydrofuran (THF) under magnetic stirring to prepare a mixture, in which the weight ratio of PMMA to THF was 5:100.

Styrene-butadiene rubber (SBR) and carboxymethylcellulose (CMC) were dissolved in water, and then mixed with artificial graphite and a conductive agent under high-speed stirring at room temperature for 3.5 hours to prepare a negative material, in which the weight ratio of SBR, CMC, the artificial graphite and the conductive agent was 2.5:1.5:90:6. The negative material was coated onto a copper foil, baked and pressed to form a negative plate.

$LiCoO_2$, a binder and carbon black were mixed in a weight ratio of 100:0.8:0.5 to prepare a slurry (i.e. positive material). The slurry was coated onto an aluminium foil to prepare a positive plate.

The mixture was coated onto the negative plate with a coater, and baked at a temperature of 60° C. for 10 hours to prepare a composite negative plate Ra2 (negative) coated with a polymer membrane. The mixture was coated onto the positive plate with the coater, and baked at a temperature of 60° C. for 10 hours to prepare a composite positive plate Ra2 (positive) coated with a polymer membrane. The thickness of the polymer membrane coated on the composite negative plate Ra2 (negative) is 4.3 μm, and the thickness of the polymer membrane coated on the composite positive plate Ra2 (positive) is 5.2 μm.

The composite negative plate Ra2 (negative) was cut into wafers with a diameter of 16 mm, which were dried at a temperature of 85° C. under vacuum for 12 hours and then put into a glove box filled with argon gas. The composite positive plate Ra2 (positive) was cut into wafers with a diameter of 13 mm, which were dried at a temperature of 85° C. under vacuum for 12 hours and then put into a glove box filled with argon gas.

A PE separator was used for separating the composite negative plate Ra2 (negative) from the composite positive plate Ra2 (positive) to form a battery core, an electrolyte was injected into the battery core, and sealing was performed to form a 2016 type artificial graphite/$LiCoO_2$ polymer lithium ion battery DS20.

Comparative Example 3

A polyvinylidene fluorine (PVDF) with a glass transition temperature of −40° C. was uniformly mixed with acetone under magnetic stirring to prepare a mixture, in which the weight ratio of the PVDF to acetone was 5:100.

The mixture was coated onto two surfaces of a PE separator and baked at a temperature of 60° C. for 10 hours to prepare a composite separator Ra3 coated with a polymer membrane. The thickness of the polymer membrane was 7.3 μm.

The mixture was cast onto a PTFE plate and baked at a temperature of 60° C. for 10 hours to prepare a testing membrane Rb3 coated with a polymer membrane.

The composite separator Ra3 was cut into wafers with a diameter of 17 mm, which were dried at a temperature of 80° C. under vacuum for 12 hours and then put into a glove box filled with argon gas.

$LiCoO_2$, a binder and carbon black were mixed in a weight ratio of 100:0.8:0.5 to prepare a slurry (i.e. positive material), which was coated onto an aluminium foil to prepare a positive plate.

The composite separator Ra3 was used for separating a lithium plate (i.e. negative plate) from the positive plate to form a battery core, an electrolyte was injected into the battery core, and sealing was performed to form a 2016 type $Li/LiCoO_2$ polymer lithium ion battery DS30.

Comparative Example 4

A polyvinylidene fluorine (PVDF) with a glass transition temperature of −40° C. was uniformly mixed with acetone under magnetic stirring to prepare a mixture, in which the weight ratio of the PVDF to acetone was 5:100.

Styrene-butadiene rubber (SBR) and carboxymethylcellulose (CMC) were dissolved in water, and then mixed with artificial graphite and a conductive agent under high-speed stirring at room temperature for 3.5 hours to prepare a negative material, in which the weight ratio of SBR, CMC, the artificial graphite and the conductive agent was 2.5:1.5:90:6. The negative material was coated onto a copper foil, baked and pressed to form a negative plate.

$LiCoO_2$, a binder and carbon black were mixed in a weight ratio of 100:0.8:0.5 to prepare a slurry (i.e. positive material). The slurry was coated onto an aluminium foil to prepare a positive plate.

The mixture was coated onto the negative plate with a coater, and baked at a temperature of 60° C. for 10 hours to prepare a composite negative plate Ra4 (negative) coated with a polymer membrane. The mixture was coated onto the positive plate with the coater, and baked at a temperature of 60° C. for 10 hours to prepare a composite positive plate Ra4 (positive) coated with a polymer membrane. The thickness of the polymer membrane coated on the composite negative plate Ra4 (negative) is 4.6 μm, and the thickness of the polymer membrane coated on the composite positive plate Ra4 (positive) is 5.1 μm.

The composite negative plate Ra4 (negative) was cut into wafers with a diameter of 16 mm, which were dried at a temperature of 85° C. under vacuum for 12 hours and then put into a glove box filled with argon gas. The composite positive plate Ra4 (positive) was cut into wafers with a diameter of 13 mm, which were dried at a temperature of 85° C. under vacuum for 12 hours and then put into a glove box filled with argon gas.

A PE separator was used for separating the composite negative plate Ra4 (negative) from the composite positive plate Ra4 (positive) to form a battery core, an electrolyte was injected into the battery core, and sealing was performed to form a 2016 type artificial graphite/LiCoO$_2$ polymer lithium ion battery DS40.

Performance Testing

1. SEM (Scanning Electron Microscopy)

The micro morphologies of the PE separator and the composite separator Ma5 in Example 5 were observed with a scanning electron microscope (SEM, JEOL, JSM-7600FE).

Figure 1:
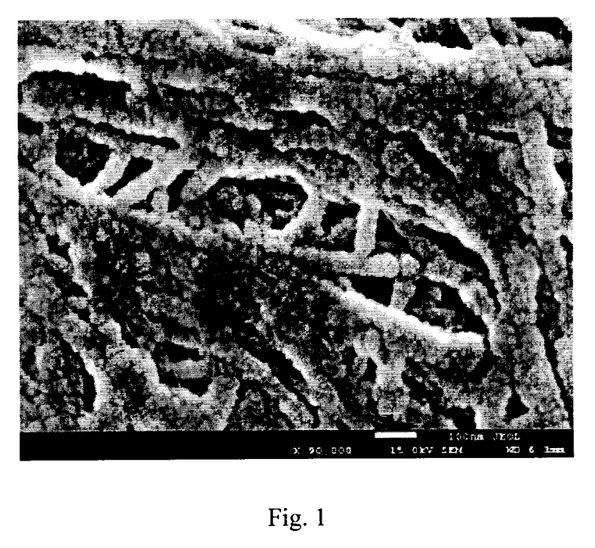
FIG. 1 shows an SEM image of a PE separator with a magnification of 90000 according to Example 5.
Figure 2:
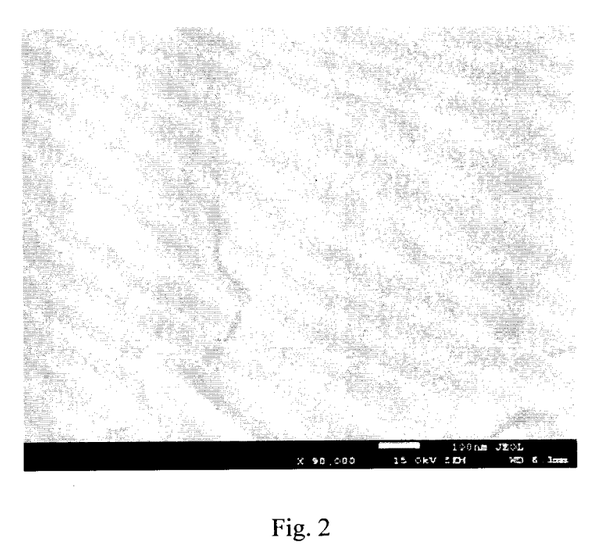
FIG. 2 shows an SEM image of a polymer membrane Ma5 with a magnification of 90000 according to Example 5.

As shown in FIG. 1 and FIG. 2, there are many pores in the surface of the PE separator, and a compact polymer layer (i.e. polymer membrane) is formed on the surface of the PE separator after the polymer mixture is coated onto the two surfaces of the PE separator and thermocured.

2. Thermostability

Figure 3:
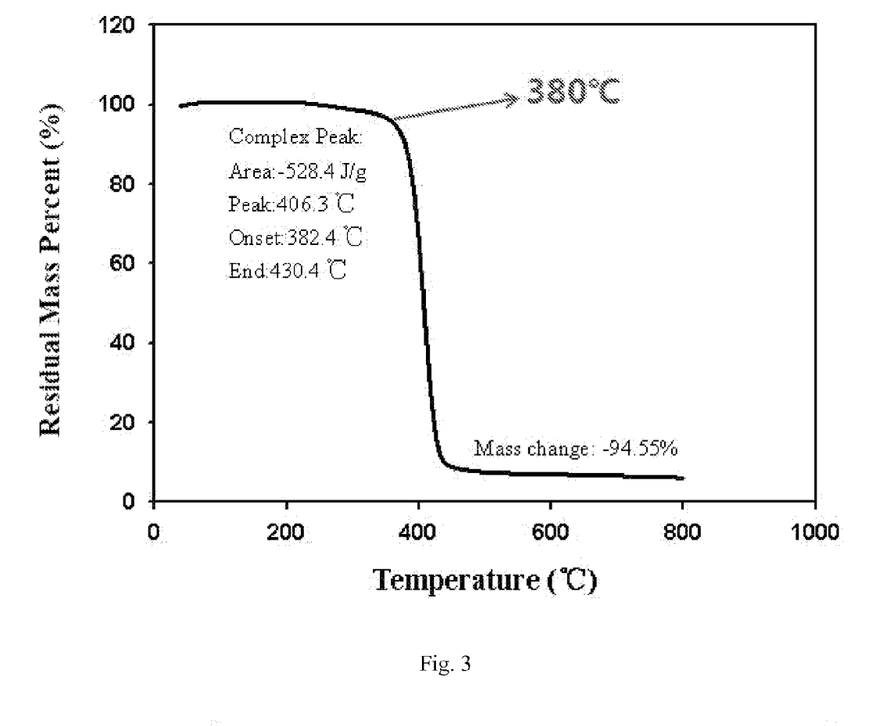
FIG. 3 shows a thermogravimetric curve of a testing separator Mb5 according to Example 5.

The testing separators Mb1-9, Rb1 and Rb3 were respectively tested by thermogravimetric analysis (TGA) with a STA449PC simultaneous thermal analyzer from German NETZSCH Group, with a sample weight of 10-15 mg at a temperature ranging from 30° C. to 800° C. at a heating rate of 10° C./min in an argon atmosphere to obtain thermogravimetric curves of individual testing separators. The decomposition temperatures of the testing separators were recorded from the thermogravimetric curves thereof. The results were shown in Table 1. The thermogravimetric curve of the testing separator Mb5 was shown in FIG. 3.

As shown in Table 1, the decomposition temperatures of the polymer membranes formed by thermocuring and self-cross-linking are very high, indicating that they have an excellent thermal stability. Therefore, it is possible to make the polymer lithium ion batteries comprising the polymer membranes have a better safety performance.

3. Electrolyte Absorbing Ability

The testing membranes Mb1-9, Rb1 and Rb3 were dried, and the dried testing membranes Mb1-9, Rb1 and Rb3 were weighed. Then, the dried testing membranes Mb1-9, Rb1 and Rb3 were immersed into lithium salt solutions (i.e. electrolytes) for 24 hours respectively. After the membranes were taken out and the electrolytes on the surface of the membranes were removed respectively, the membranes were weighted to calculate the electrolyte absorbing efficiency thereof respectively. All the operations were performed in a glove box filled with argon gas.

The electrolyte absorbing efficiency (i.e. lithium salt absorbing efficiency) was calculated by a formula:

Electrolyte Absorbing Efficiency (%)=($W2-W1$)/$W1$×100% where W1 is the original weight of the dry membrane, and W2 is the weight of the dry membrane after absorbing the lithium salt (g). The results were recorded in Table 1.

As shown in Table 1, the electrolyte absorbing ability of the polymer membranes formed by thermocuring and self-cross-linking is excellent, indicating that the compatibility of the polymer membranes and the electrolyte is very good so as to provide enough high ion conductivity. Therefore, it is possible to enable the polymer lithium ion batteries comprising the polymer membranes to have good electrochemical performance.

4. Electrical Conductivity

Impedance of R of the gel polymer composite electrolytes of Examples 1-6, Comparative Example 1 and Comparative Example 3 were tested by putting the composite separators Ma1-6, Ra1 and Ra3 between two stainless steel (SS) electrodes respectively to absorb enough amount of electrolytes, and sealing the composite separators Ma1-6, Ra1 and Ra3 in 2016 type Li/LiCoO$_2$ polymer lithium ion batteries respectively. The ion conductivity was calculated by the following formula:

$$\sigma = L/A \cdot R,$$

where L is the thickness of the gel polymer composite electrolyte, A is the surface area of the SS electrode that contacts with the separator, and R is the resistance of the gel polymer composite electrolyte. The results were shown in Table 2.

As shown in Table 2, the electrical conductivity of the gel polymer composite electrolyte after the polymer membrane absorbs the electrolyte is higher than that of the polymer electrolyte in the related art, so that it is possible to enable the polymer lithium ion battery comprising the gel polymer composite electrolyte to have good electrochemical performance.

5. Electrochemical Stability Window

Figure 4:
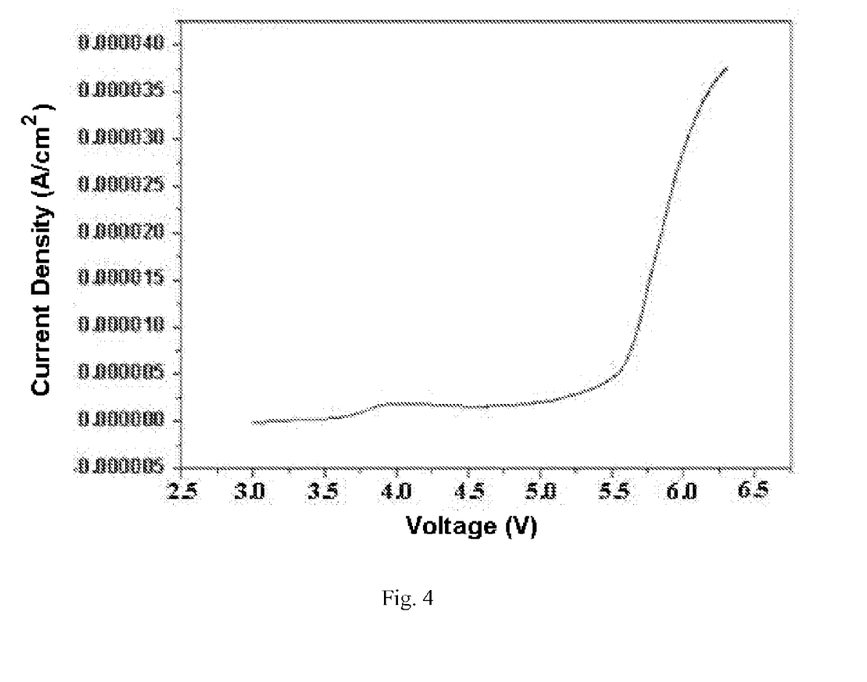
FIG. 4 shows a decomposition voltage curve of the gel polymer composite electrolyte formed after a polymer membrane Ma5 absorbs an electrolyte according to Example 5.

An electrochemical stability window test was carried out by an electrochemical workstation (CHI 660C, CHInstruments Co., Ltd. Shanghai, P.R.C). Each of the composite separators Ma1-6, Ra1 and Ra3 was used for separating the lithium plate from the SS plate, and then an electrolyte was injected into the battery core, and sealing was performed to form a 2016 type Li/SS polymer lithium ion battery. The SS plate was used as the working electrode, and the metal lithium plate was used as the counter electrode and the reference electrode. The gel polymer composite electrolytes were obtained after individual composite separators absorbed enough amount of electrolytes. The electrochemical windows were determined by the linear scanning voltammetry at a scan rate of 0.0005V/s to obtain decomposition voltage curves of individual gel polymer composite electrolytes. The decomposition voltages were obtained from the decomposition voltage curves, and the results were recorded in Table 2. The decomposition voltage curve of the gel polymer composite electrolyte obtained after the composite separator Ma5 absorbed the electrolyte was shown in FIG. 4.

As shown in Table 2, the electrochemical windows of the gel polymer composite electrolytes after the polymer membranes absorb the electrolytes are wide enough to enable the gel polymer composite electrolytes to be used in the high-voltage-withstand polymer lithium ion batteries.

6. Electrochemical Stability

An electrochemical stability test was carried out by electrochemical workstation (CHI 660C, CHInstruments Co., Ltd. Shanghai, P.R.C). The composite separator Ma5 was used for separating the lithium plate from the SS plate, and then an electrolyte was injected into the battery core, and sealing was performed to form a 2016 type Li/SS polymer lithium ion battery. The SS plate was used as the working electrode, and the metal lithium plate was used as the counter electrode and the reference electrode. The gel polymer composite electrolyte was obtained after the composite separator Ma5 absorbed enough amount of electrolyte. The electrochemical stability was determined by cyclic voltammetry at a scan rate of 0.0005V/s with a scanning range of −0.5V to 4.5V to obtain a cyclic voltammogram as shown in FIG. 5.

Figure 5:
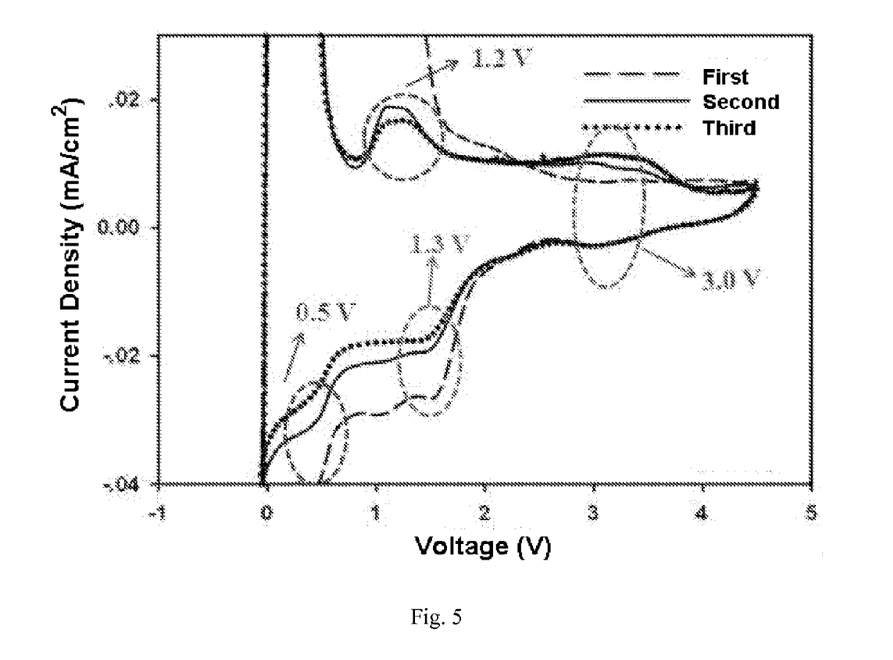
FIG. 5 shows a cyclic voltammogram of the gel polymer composite electrolyte formed after a polymer membrane Ma5 absorbs an electrolyte according to Example 5.

As shown in FIG. 5, the lithium red-ox peak (Li<=>Li$^+$) appears near 0 V, the decomposition peak of the SEI membrane appears at 1.2 V, the VC reduction peak appears at 1.3 V, the EC reduction peak appears at 0.5 V, the SS red-ox peak (Fe<=>Fe$^{2+}$) appears near 3.0 V, and the polymer membrane has no oxidation or reduction behavior. It indicates that the gel polymer composite electrolyte after the polymer membrane absorbs the electrolyte have a good stability with a range of −0.5 V to 4.5 V (i.e. the working voltage range of the lithium ion battery).

7. Charge-Discharge Ability of Button Cell

The polymer lithium ion batteries S10-90 and DS10-40 were charged and discharged test for the first time by a lithium ion battery performance test cabinet (BK6016, Lanqi Co., Ltd. Guangzhou, P.R.C). The batteries were charged at a constant current of 0.075 mA/cm$^2$ until the voltage was 4.2 V, and charged at the constant voltage of 4.2 V. When the current was 0.038 mA/cm$^2$, the charge capacities were recorded. Then, the batteries were discharged at a constant current of 0.075 mA/cm$^2$ until the voltage was 3.0 V, and the discharge capacities were recorded respectively. The specific capacity and the initial charge-discharge efficiency of the batteries were calculated by the following formula:

specific capacity=discharge capacity/weight of LiCoO$_2$;

initial charge-discharge efficiency=initial discharge capacity/initial charge capacity×100%

As shown in Table 3, the polymer lithium ion batteries according to the present disclosure have an excellent initial charge-discharge ability.

8. Cycling Ability of Button Cell

Figure 6:
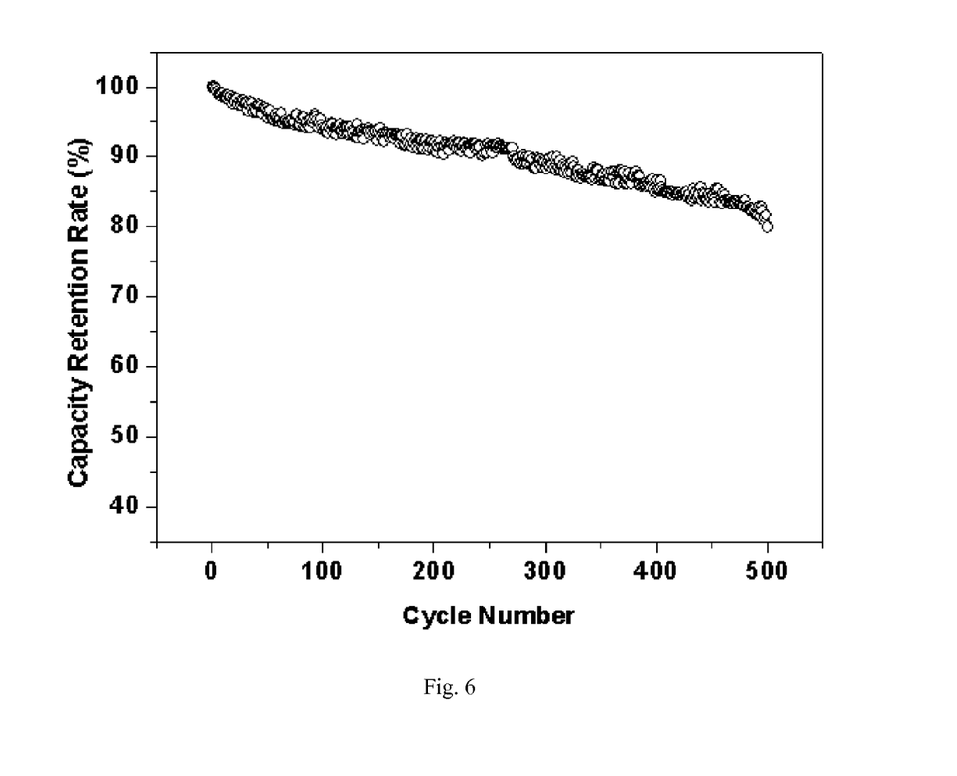
FIG. 6 shows a relationship curve of a capacity retention rate of a 2016 type Li/LiCoO$_2$ polymer lithium ion battery S20 versus a cycle number in a 1 C cyclic process according to Example 2.

The polymer lithium ion batteries S10-90 and DS10-40 were charged at a constant current of 3.01 mA/cm$^2$ (1 C) until the voltage was 4.2 V by a lithium ion battery performance test cabinet (BK6016, Lanqi Co., Ltd. Guangzhou, P.R.C). The batteries were discharged at a current of 3.01 mA/cm$^2$ (1 C) until the voltage was 3.0 V to complete a cycle respectively. The relationship curve of a capacity retention rate versus a cycle number in a 1 C cyclic process was determined. The results were recorded in Table 3. For example, the relationship curve of the capacity retention rate of the polymer lithium ion battery S20 versus a cycle number was shown in FIG. 6. The cycle numbers of the polymer lithium ion batteries when the capacity retention rate thereof was 80% were recorded from the relationship curves.

As shown in the Table 3, the polymer lithium ion batteries according to the present disclosure have an excellent cycle performance.

TABLE 1

| Sample | Decomposition Temperature (° C.) | Electrolyte Absorbing Efficiency |
| --- | --- | --- |
| Mb1 | 376 | 800 |
| Mb2 | 362 | 776 |
| Mb3 | 337 | 651 |
| Mb4 | 365 | 804 |
| Mb5 | 382 | 780 |
| Mb6 | 332 | 654 |
| Mb7 | 330 | 793 |
| Mb8 | 360 | 641 |
| Mb9 | 350 | 772 |
| Rb1 | 280 | 390 |
| Rb3 | 350 | 100 |

TABLE 2

| Composite Separator | Electrical Conductivity (mS/cm) | Decomposition Voltage |
| --- | --- | --- |
| Ma1 | 9.88 | 5.4 |
| Ma2 | 8.84 | 5.2 |
| Ma3 | 7.23 | 5.0 |
| Ma4 | 9.96 | 5.1 |
| Mb5 | 8.91 | 5.5 |
| Ma6 | 7.28 | 5.1 |
| Ra1 | 3.56 | 4.8 |
| Ra3 | 4.03 | 4.5 |

TABLE 3

| Polymer Lithium Ion Battery | Specific Capacity | Initial Charge-Discharge Efficiency | Battery 1 C Cycle Number |
| --- | --- | --- | --- |
| S10 | 147 | 99.01 | 516 |
| S20 | 144 | 97.03 | 500 |
| S30 | 139 | 95.03 | 465 |
| S40 | 146 | 99.32 | 521 |
| S50 | 143 | 96.89 | 488 |
| S60 | 140 | 95.28 | 454 |
| S70 | 146 | 96.52 | 510 |
| S80 | 141 | 94.67 | 449 |
| S90 | 144 | 95.21 | 476 |
| DS10 | 135 | 94.22 | 306 |
| DS20 | 133 | 94.87 | 314 |
| DS30 | 136 | 93.61 | 331 |
| DS40 | 137 | 94.32 | 324 |

Although the disclosure has been described in detail with reference to several embodiments, additional variations and modifications exist within the scope and spirit of the disclosure as described and defined in the following claims.

Many modifications and other embodiments of the present disclosure will come to mind to one skilled in the art to which the present disclosure pertains having the benefit of the teachings presented in the foregoing description. It will be apparent to those skilled in the art that variations and modifications of the present disclosure can be made without departing from the scope or spirit of the present disclosure. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A gel polymer composite electrolyte comprising:
    a polymer membrane comprising a three-dimensional network of cross-linked acrylic emulsion, wherein the acrylic emulsion having a glass transition temperature ranging from about −30° C. to about 50° C. is cross-linked in the presence of water and ammonia water;
    an electrolyte absorbed in the polymer membrane, wherein the electrolyte comprises a lithium salt and an organic solvent; the organic solvent is selected from the group consisting of ethylene carbonate, propylene carbonate, diethyl carbonate, dimethyl carbonate, methyl ethyl carbonate, vinylene carbonate, or combinations thereof; and the concentration of the lithium salt ranges from about 0.8 mol/L to about 1.5 mol/L.

2. The gel polymer composite electrolyte of claim 1, wherein the acrylic emulsion has a glass transition temperature ranging from about −18° C. to about 38° C.

3. The gel polymer composite electrolyte of claim 1, wherein a volumetric ratio of the acrylic emulsion to the water is about 100:5 to about 100:50, and the amount of ammonia water ranges from about 0.001 wt % to about 10 wt %, based on the total weight of the acrylic emulsion and the water.

4. The gel polymer composite electrolyte of claim 1, wherein the lithium salt is selected from the group consisting of lithium hexafluorophosphate, lithium perchlorate, and lithium tetrafluoroborate.

5. The gel polymer composite electrolyte of claim 1, which connects a positive electrode and a negative electrode of a battery.

* * * * *